United States Patent [19]

Moeller

[11] 3,987,283
[45] Oct. 19, 1976

[54] DIGITAL CONTROLLER FOR PUNCH PRESSES AND THE LIKE

[76] Inventor: Charles R. Moeller, 2133 Oxford, Cardiff-by-the-Sea, Calif. 92007

[22] Filed: July 7, 1975

[21] Appl. No.: 593,686

[52] U.S. Cl. .......................... 235/151.11; 192/127; 234/32; 318/563; 340/419
[51] Int. Cl.² ...................... G06F 15/46; G05B 9/02
[58] Field of Search ............ 235/151, 151.1, 151.11, 235/153 A; 340/172.5, 419; 444/1; 83/50, 55, 57, 58, 62, 63, 71, 72–74, 360, 361, 364, 370–372, 396, 522, DIG. 1; 29/432, 26 R, DIG. 37; 76/5 B; 192/126, 127, 134; 234/30, 32, 34, 38, 39; 318/563, 565, 566

[56] References Cited
UNITED STATES PATENTS

| | | | |
|---|---|---|---|
| 3,370,492 | 2/1968 | Treff .................................. | 83/71 |
| 3,646,542 | 2/1972 | Anthony ......................... | 340/419 X |
| 3,809,488 | 5/1974 | Sonderegger .................... | 318/566 X |
| 3,882,305 | 5/1975 | Johnstone ...................... | 235/151.11 |
| 3,887,052 | 6/1975 | Del Faro ........................... | 192/127 |

Primary Examiner—Joseph F. Ruggiero
Attorney, Agent, or Firm—Harris, Kern, Wallen & Tinsley

[57] ABSTRACT

A digital type controller for a punch press or the like which includes a shaft angle encoder for generating control pulses corresponding to specific main shaft angles of the machine, a plurality of sensors for generating signals in response to the operating condition of the machine and process, a plurality of circuits for enabling the reception of said signals at selectable shaft angles of the machine, a plurality of circuits for enabling the reception of said signals in a selectable prescribed order, a plurality of circuits for storing said signals, a plurality of circuits for sampling the stored signals at selectable shaft angles of the machine, a plurality of circuits which detect the presence or absence of the sampled signals, an output circuit for deenergizing the machine Run control circuit when an absence of a sampled signal occurs, a plurality of circuits for energizing and deenergizing external electrical loads at selectable shaft angles of the machine, and a shaft encoder/decoder which provides control pulses corresponding to selectable input shaft angles at a plurality of selectable output terminals.

28 Claims, 12 Drawing Figures

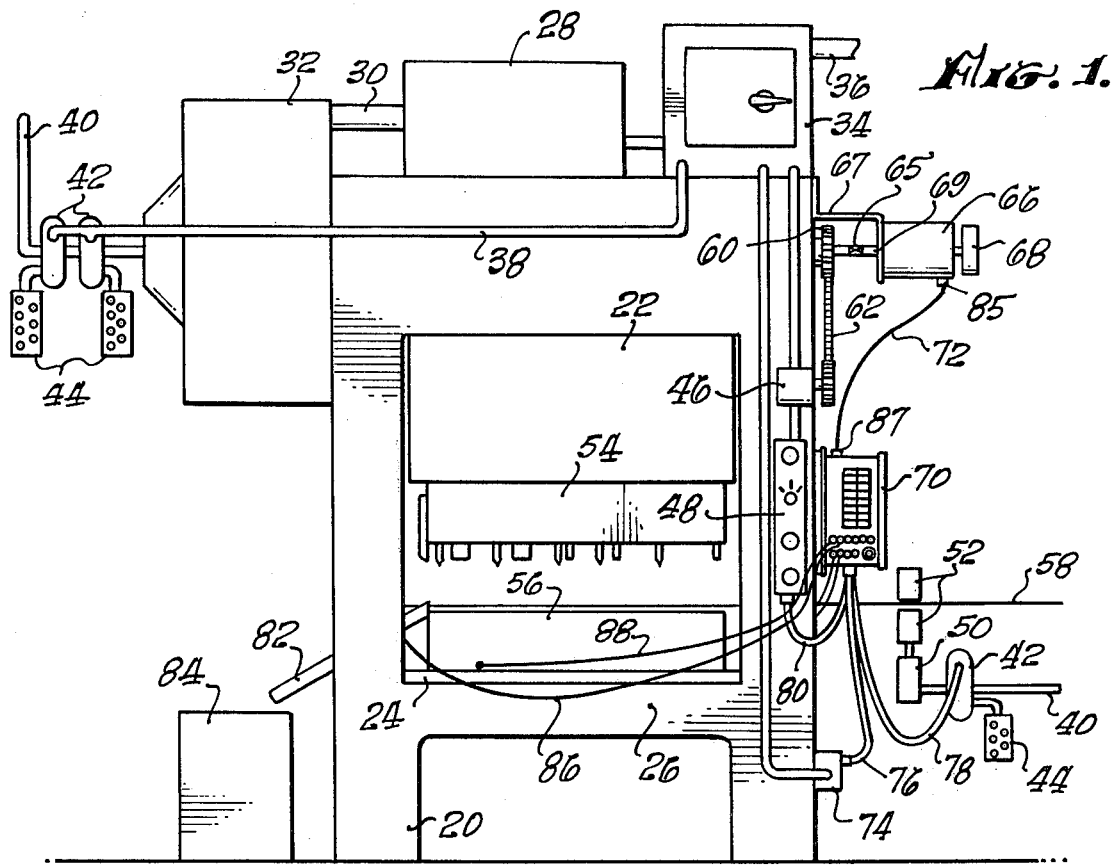
FIG. 1.
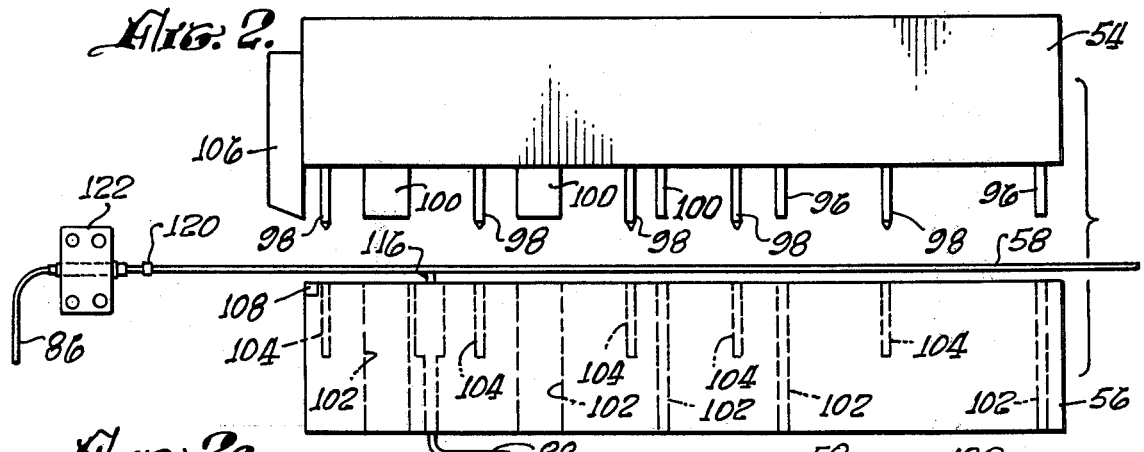
FIG. 2.
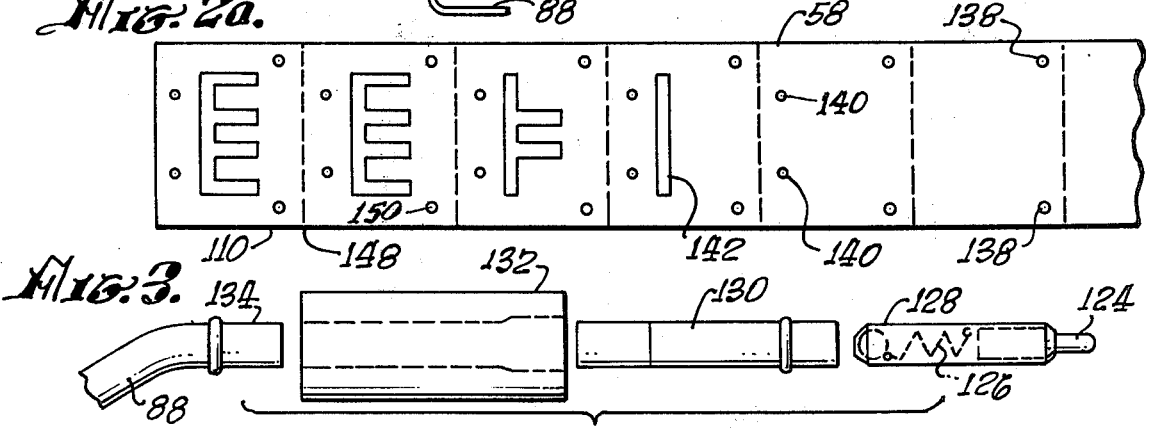
FIG. 2a.
FIG. 3.

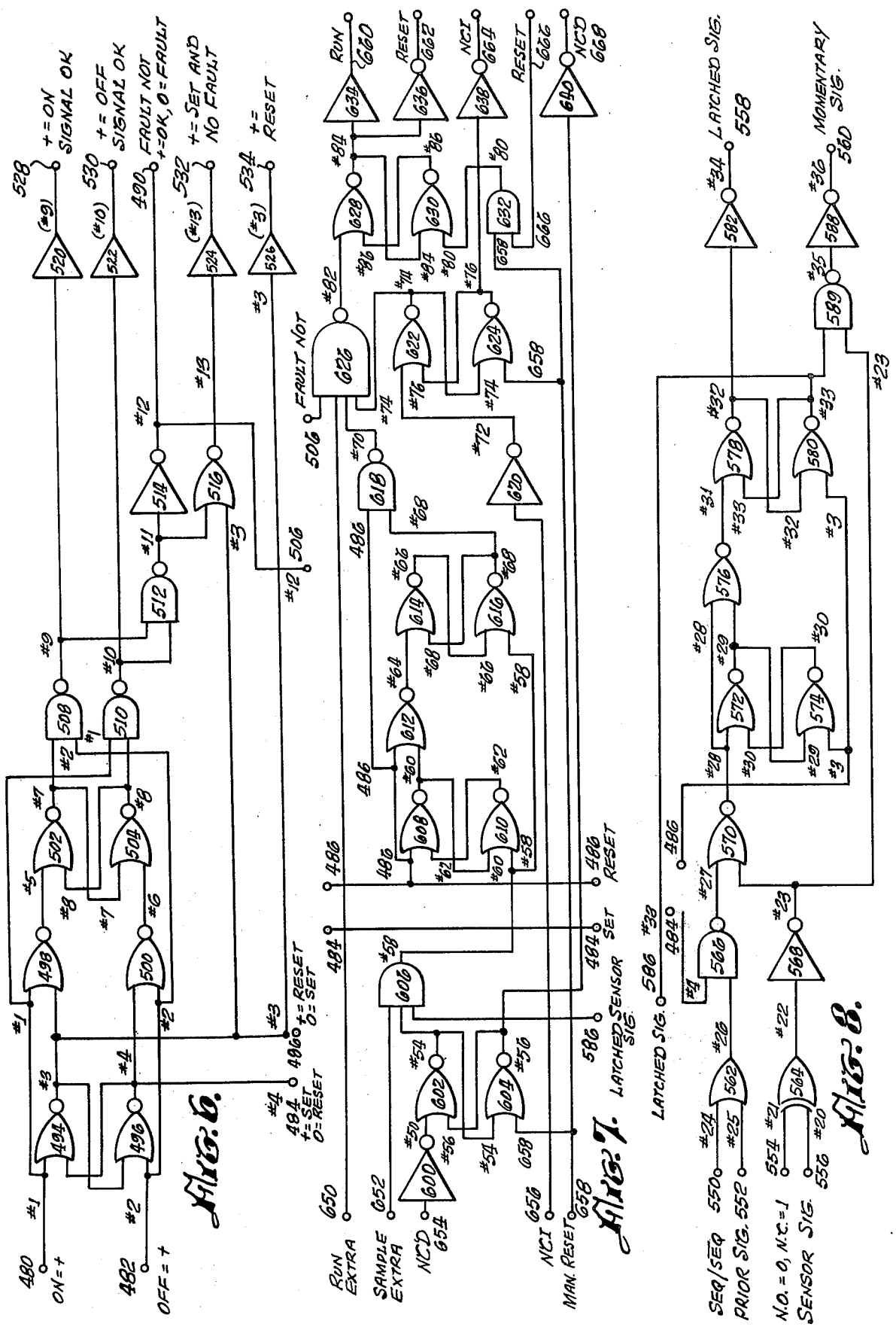

DIGITAL CONTROLLER FOR PUNCH PRESSES AND THE LIKE

BACKGROUND OF THE INVENTION

This invention relates to controllers similar to the type known in the metal stamping industry as malfunction detectors which are used to monitor and stop various automatic stamping processes upon reception of a machine-element or work-piece malfunction signal. In particular, this invention relates to controllers suitable for use in conjunction with continuous cycle punch presses or the like for monitoring the process to prevent or decrease machine, tooling, and work-piece damage, and also to initiate or control various steps or functions of the process.

Continuous process metal stamping machines (e.g., punch presses equipped with progressive or transfer dies which form and punch out integral parts from a continuous strip of material) are subject to inordinate shutdown and expensive repair or replacement of tooling when an anomaly occurs in the processing cycle such as: mis-feed (mis-registration of the work-piece or strip), mis-position of machine element (broken spring or actuator), part not ejected, etc., and the machine is not stopped before the next strike (die closure). Since these machines are usually run at speeds ranging from 50 strokes per minute to 150 strokes per minute, a human operator is not physically able to react to a malfunction and stop the machine before damage occurs, especially as the most potentially damaging problems arise from process malfunctions occurring inside the dies and usually not visible to an operator.

The evolution and use of malfunction detectors as bolt-on equipment peripheral to punch presses and the like has advanced through manufacturers' need to reduce occurrence and costs of damaged tooling, and the reluctance of machine manufacturers to enter the field of process control due to installation and maintenance demands, and the wide variations of processes which can be served by such equipment.

Early malfunction detectors were crude and consisted of a pair or more contacts or switches actuated by the work-piece and a machine-element connected in a series/parallel arrangement with the punch press RUN relay control power. This arrangement often exposed the set-up man or machine operator to electric shock hazard.

Later malfunction detectors provided individual channels, each comprised of sensor, go/no-go circuit, lamp indication and relay control of run control power. Timing and acceptance of sensed signals were accomplished by charge/discharge of resistance-capacitance (RC) networks which are influenced by component age, temperature, and line voltage variations. There was no provision for sensing failures occurring in the internal circuits of the malfunction detector.

More recently, some malfunction detectors were manufactured with solid-state components and have rudimentary circuit failure sensing means. In these embodiments, however, it is still possible for the monitored machine to continue running for one or more strokes after a circuit failure has occurred, and, in which case, the punch press stop-point is generally indeterminate due to the continued practice of using RC timing circuits, allowing tooling damage to occur in some instances.

Present tooling in the metal stamping industry has become more complicated and thereby more costly, and the need for increased production has raised punch press speeds with a consequent demand for better protection of tooling.

A continuous-feed punch press is comprised, basically, of a motor and controls, a crank shaft with an attached brake and clutch, a moveable ram connected to the crank shaft, a fixed bed, and a rigid frame to hold these parts in an aligned, working arrangement. During normal operation, the main shaft is continuously revolved in one direction and the crank-connected ram moves up and down repetitively in response. A die-set containing various punching and forming tools is fixed to ram and bed. A means of feeding strip material (often steel) into the die-set is ordinarily a pair of smooth metal rollers which grip the strip and, powered from the main shaft by a crank and rack and pinion gear, advance the strip on alternate half-revolutions of the main shaft through a unidirectional clutch. The feed mechanism is usually adjusted so the feed occurs half during the up-stroke after the die opens and half during the down-stroke before the die closes on the strip. A cam operated roller release mechanism causes the rollers to grip the strip during the feed operation and to release the strip during the punching part of the machine cycle.

In operation, after the strip has been advanced, and before the feed rollers release, pilot members of the die enter pilot holes in the strip which holes were punched in a previous stroke. The feed rollers then release and as the die closes, the pilots register the strip in the die accurately. Punching and forming members do their work as the die continues to close.

On the up-stroke, the die begins to open, the feed rollers grip the strip and after the pilots emerge from the strip, the rollers begin to advance the strip.

In progressive dies, the number of stations (die segments) the strip progresses or advances through increases in direct proportion to the complexity of the part being fabricated. In this type of stamping operation, the feeding of strip material is a very important function and parameter, and should be monitored because if for some cause, such as roller slippage, or blocking in the die of the progression of the strip by a piece of scrap material, etc., the strip fails to advance far enough for the pilots to enter the pilot holes, the pilots (of blunt, bullet-nosed shape) will deform the strip and may split the die section under them at the point of impact as the die closes.

For the above circumstance, feed completion is monitored by a mis-feed malfunction detector channel and if the strip does not advance the correct amount, the protective circuits will stop the machine before the pilots enter the strip.

In punch presses as described above, in which feeding occurs over an arc of 180° of one revolution, it is advantageous to begin the feed as early on the upstroke as possible so that feeding is completed as early on the down-stroke as possible in order to give enough time for the ram to be stopped by release of the clutch and actuation of the brake before the pilots enter the strip in the case of a protective stop on mis-feed.

A mis-feed channel could be termed "end of feed detector," because the signal of importance would occur at or very near the time of the end or completion of the feed advancement. Such a channel would have a single sensor which could be an electrically insulated metal probe with an exposed metal tip positioned in or near the die so as to make contact with the metal strip only when the strip is advanced the full feed increment. The probe would be connected by wire to one terminal of a low voltage relay coil, the other terminal of which connected to one terminal of a low voltage source. The other terminal of the low voltage source would be connected to common ground. The frame of the machine is also connected to common ground. Thus, when the strip contacts the probe, the circuit for the coil is completed through metal on metal contacts: probe to strip, strip to die, die to bed, bed to frame. So energized, a set of N.O. (normally open) contacts on the relay close, which contacts are wired in parallel with a set of contacts (N.O.) of a cam operated switch which are being held closed by a cam positioned on or geared to the main shaft of the machine. The cam is so shaped as to hold the switch contacts closed until just after the end of the feed occurs, at which time the cam releases the switch for some period corresponding to a definite shaft angle. This shaft angle is determined in part by the point in the cycle at which the projecting strip (now a formed part) is cut off as a finished piece and thus breaks contact with the probe. The parallel set of contacts described are wired in series with the power to the "run" control circuit of the punch press. If both contacts open at the same time, the machine stops. Therefore, if on every machine cycle, the feed probe makes continuous contact with the strip while the cam operated switch is open, the machine will continue to operate. In this case of a mis-feed, when the cam operated switch opens, the relay not having been energized by probe to strip contact, has open contacts also and the machine is stopped by loss of power to the run control circuit. Optimumly, the probe and cam and the feed cycle have all been adjusted for best performance and the punch press stops before any damage is done.

In the above example, the machine continues to run until a missing end of feed signal, hence: a miss.

One draw-back of the above circuitry (equivalent to the early forms of malfunction detectors) is the false signal. A false signal would be generated in the above example by a piece of scrap or other metal continuously maintaining a connection between the probe and common ground (die, bed, or frame of machine). In such a case, when the cam operated switch opened to check the end of feed, the scrap metal continuously provides an "OK to run" (RUN) signal regardless of the feed condition. If under these circumstances, a mis-feed occurs, the punch press would continue to run and tooling damage would occur. There is no inherent protection in the above described circuitry to prevent such an event from bypassing the purpose of the mis-feed detector channel. An operator, due to some misunderstanding of the purpose of such a detector, and not having success in getting the machine to run continuously with it due to a possible failure in another part of the circuit, e.g., faulty cam switch, cam loose or misadjusted, loose or broken wire, etc., may choose to purposely bypass the circuit by simply connecting the probe or its connecting wire to common ground.

Another draw back of the above circuit is the fault condition. A fault signal would occur when the cam operated switch failed in the closed position. In such a case, the switch contacts maintain Run control power continuously and, although the probe and its associated relay work consistently, the cam operated switch contacts never open to allow the end of feed signal presence to be checked. Therefore, on a mis-feed, a fault signal will allow the punch press to continue to run and again tooling damage will occur.

SUMMARY OF THE INVENTION

It is, therefore, a primary object of the present invention to provide a digital type controller for a punch press or the like (hereinafter called machine) which operates to decrease the occurrence of tooling damage. Another object of the invention is to provide such a controller which operates with accuracy and repeatability by using control pulses corresponding to specific shaft angles of the main shaft of the machine. Another object of the invention is to provide such a controller which generates control pulses corresponding to specific main shaft angles.

It is a further object of the invention to provide such a controller which decreases the reception of false sensor signals by accepting sensor signals at selectable main shaft angles. Another object of the invention is to provide such a controller which decreases the reception of false sensor signals by accepting such signals in a selectable prescribed order. An additional object of the invention is to provide such a controller which stores input sensor signals for sampling at a later time (or further main shaft angle). Another object of the invention is to provide such a controller which samples the storage means for presence of the previously accepted input sensor signals at selectable shaft angles.

It is another object of the invention to provide such a controller which initiates a machine stop in response to a missing signal or malfunction at selectable main shaft angles. A further object of the invention is to provide such a controller which will perform reliably by sensing false signals as equivalent to missing signals or malfunction signals. Another object of the invention is to provide such a controller which performs reliably by initiating a machine stop upon detection of a fault signal. An additional object of the invention is to provide such a controller which will initiate a machine stop immediately upon reception of certain sensor signals regardless of the main shaft angle.

It is an additional object of the invention to provide such a controller which can operate auxilliary electrical loads such as relays or the like in support of the machine and process or in support of another machine and/or process at selectable shaft angles of the machine. Another object of the invention is to provide such a controller which is versatile and adaptable to many process configurations by means of its programming capability whereby sensor channels may be preselected to be on or off, sensors may be set to be N.O. or N.C., sensors may be enabled at selectable main shaft angles, sensors may be prescribed to sense signals in a specific order, stored signals may be sampled at selectable main shaft angles, and electrical loads may be energized and deenergized at selectable main shaft angles.

Another object of the invention is to provide such a controller which displays a continuous indication of the condition of the process, the machine, and the controller on a status indication panel. A further object of the invention is to provide such a controller, though capable of controlling large amounts of power, uses very little power for its own operation or status indication. Another object of the invention is to provide a versatile all-purpose switching circuit for use in such machine controllers and the like which accepts input signals such as sensor signals, control signals and programming signals and provides an output signal in response to specific combinations of those input signals. An additional object of the invention is to provide a means of generating control pulses corresponding to specific machine main shaft angles, to order the control pulses in a lattice array, and to provide for selection of one or more individual control pulses corresponding to a specific main shaft angle for the operation of each of a plurality of control pulse responsive circuits at the selected main shaft angles.

The invention is directed to a control system for a cyclicly machine and includes means for generating position pulses corresponding to positions of the machine in its operating cycle, sensors for generating sensor signals indicating conditions of the machine, means having the machine position pulses and the sensor signals as inputs and providing output signals representative of the machine condition at preselected machine positions, and means responsive to such output signals for stopping or otherwise controlling the machine operation for various signal situations. When a fault condition is sensed by a preselected sensor means at a preselected machine position, the machine operation is interrupted. Similarly, when the sensor signals are not generated in a preselected sequence, indicating a malfunction in the sensors, machine operation is interrupted. Machine operation may be stopped immediately or may be stopped after a time delay, depending on the criticality of the condition and the position in the operating cycle. The invention may be used in a simple form for handling one machine condition at one machine position and may be produced in a more complex form for handling a plurality of machine conditions and a plurality of machine positions. The specific embodiment illustrated may handle up to ten machine conditions at thirty-six machine positions in the operating cycle.

BRIEF DESCRIPTION OF THE DRAWINGS

FIG. 1 is a front view of a punch press incorporating the presently preferred embodiment of the invention;

FIG. 2 is a side view of a die set of the press of FIG. 1;

FIG. 2a is a top view of a strip of metal in the die set of FIG. 2;

FIG. 3 is an exploded side view of a probe used in the die set of FIG. 2;

FIG. 6 is a diagram of a pulse receiving circuit;

FIG. 7 is a diagram of a sampling, reset and run circuit;

FIG. 8 is a diagram of a sensor signal circuit;

FIG. 9 is a diagram of a control circuit incorporating the circuits of FIGS. 6, 7 and 8;

FIG. 11 illustrates and identifies the symbols used in the preceeding figures.

DESCRIPTION OF THE PREFERRED EMBODIMENTS

Figure 4:
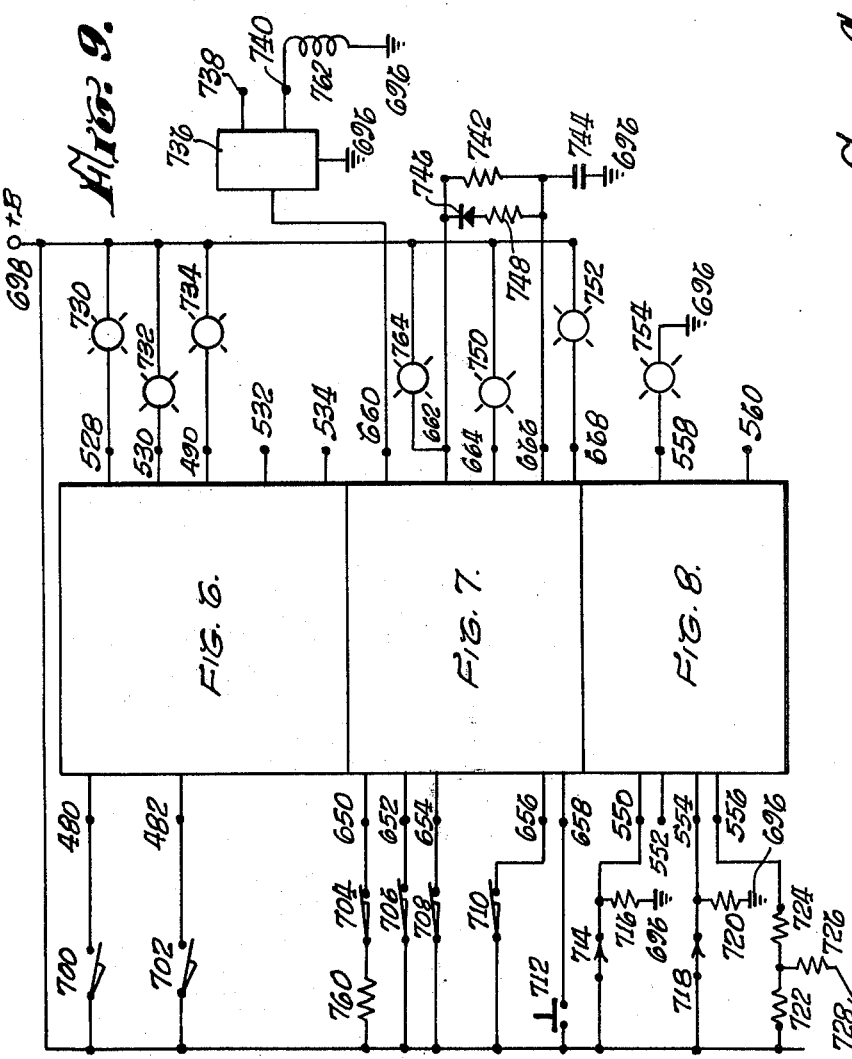
FIG. 4 is a diagram of the pulse train generated in the shaft encoder of the press of FIG. 1 plotted against degrees of input shaft rotation.

In FIG. 1 is shown a punch press similar to a BLISS 200 Ton punch press comprised of frame 20, ram 22, bolster 24, bed 26, motor 28, shaft 30, clutch, brake and flywheel 32, motor controller 34, input power 36, solenoid control power 38, air supplies 40, solenoids 42, exhaust mufflers 44, top stop control 46, operator's control panel 48, air cylinder and piston 50, gripper 52, die set 54 and 56, strip 58, main shaft and timing gear 60, chain 62, shaft encoder shaft 69, shaft coupling 65, shaft encoder housing 66, degree wheel 68, bracket 67, digital controller 70, connecting plugs 85 and 87, interconnecting cable 72, power source 74, power cable 76, solenoid control power cable 78, Run control power cable 80, parts chute 82, parts bin 84, probe wire 86 and probe wire 88.

The condition of a process is characterized in its parameters. The process parameters which one may want to monitor in a stamping operation are:
Process: End of Feed (if or when full feed occurred)
  Broken Spring or Actuator Stock Depleted (strip material used up) Pilot Swtich Actuation Part Ejected
Machine: Overstress Loss of Motion In Run mode
Controller: All Input Sensor Signals False Input Sensor Signals All Generated Signals Fault Signals Protective Stop Reset Voltages and Currents In FIG. 2 is shown the die set 54 and 56 containing pilot hole punches 96, pilot pins 98, slot punches 100, scrap relief holes 102, pilot holes 104, cut off tool 106, hardened insert 108, strip 58, end of feed probe 120, insulated mounting means 122, probe 116 and insulated connecting wires 86 and 88. The probe 116 is shown in detail in FIG. 3. Probe tip 124 is springloaded by spring 126 in capsule 128 which seats in receptacle 130 which rests in insulator 132 which fits into the die 56. An insulated probe wire 88 with metal connector 134 fits into receptacle 130 making electrical connection. The connecting wire 86 or 88 is connected to the controller at its other end.

FIG. 2a shows the strip 58. The strip 58 enters the die being moved from right to left by the feed mechanism (not shown). At the end of feed progression, the punch section 54 closes on the die section 56 and the strip 58, punching pilot holes 138 in the strip. The punch section 54 retreats, the strip progresses and the punch section 54 again moves toward the strip and the first pilots 98 enter the previously punched holes 138, registering the strip accurately. As the punch section 54 continues to close on the die section 56, punches 96 form holes 138 and 140. On the next stroke, punch 100 forms slot 142 as well. The strip continues to advance through the stations in the die set until part 110 is severed from strip 58 at line 148 by cut off tool 106. During this initial feeding operation, the operator controls the machine in INCH or JOG mode during which the machine runs only as long as the operator manually holds in the RUN buttons. Once the strip progresses successfully to the point where finished parts are being cut off, the punch press can be run in SINGLE - STROKE operation for one or more cycles to permit the operator to assess the proper operation of the machine and the proper formation of the part. As the strip advances on each stroke, the part 110 first formed will contact probe 120, generating a ground signal which will be transmitted to the controller by wire 86.

Still in SINGLE - STROKE operation, the operator will check for reception of the end of feed signal by the digital controller. At the shaft angle that the probe contacts the strip, there will be an indication, say CH 1 (channel one) on the controller's status indicator panel. If the indication is present at the proper point in the machine cycle, the operator can shift to AUTOMATIC mode on the punch press control panel, RESET the controller, and push the RUN buttons to initiate continuous cycle stamping. Once this is done, the controller will monitor the feed and will stop the machine when a mis-feed occurs.

In some dies, the finished parts do not project from the end of the die before they are cut off the strip. In those dies, the parts drop through the die and another method of progression checking must be used. The probe 116 is insulated from the die by insulator 132 and the probe tip 124 is in contact with the strip until the strip advances to a position where the probe tip 124 engages hole 150 in the strip. At that point in the feed cycle, the probe tip, being of smaller diameter than the hole 150, breaks contact with the strip and common ground, generating a signal carried by insulated wire 88 to the controller. The controller channel which monitors this signal will have been selected to monitor a normally closed (grounded) circuit for an open circuit indication which occurs when the probe tip breaks contact with the strip at hole 150. Thus, the machine may be run on AUTOMATIC with this type of end of feed sensor.

The shaft encoder 66 may be conventional and provides an electrical pulse output varying as a function of machine shaft rotation. The shaft encoder functions to close switches 182, 184, 186, 188, 190, 192 and 194 (FIG. 5) to provide output pulses at 10° intervals as shown in FIG. 4.

Since the pulse output exhibits mirror symmetry across a line 181 through 180°, the same pulse train or sequence will be produced for a complete counter clockwise revolution as well as for a complete clockwise revolution of the input shaft. One of the advantages of the above arrangement is that the shaft encoder will serve to generate shaft position information equally as well for machines having main shafts normally rotating clockwise and for machines having main shafts normally rotating counterclockwise.

Input signals to the controller and the sources of the signals may be categorized as follows:
A. Sensor Signals (generates a signal in direct relationship to the condition or parameter)
 1. Probe (senses contact with conductive material which is at ground potential)
 2. Switch or Relay Contacts (change of condition)
 3. Circuit Potential (Hi or Low)
B. Control Signals (gates, times, sets, resets)
 1. Shaft Encoder (shaft angles)
 2. Cam Switch (shaft angle or ram position)
 3. Push-button, Switch or Relay
C. Programming Signals (on, off, enable, disable, degrees, timing)
 1. Switch
 2. Wire Connection
 3. Matrix Board
 4. Module (plugged in or out)
 5. Availability of Power
D. Power Signals (available or unavailable)
 1. Unit Power (115VAC)
 2. Power Supply (15VDC)
 3. Output (115VAC Relay Control Power)

The input signals and their sources may be classified as follows:
A. Cyclic Input Signals (patterned)
 1. Probe
 2. Switch
 3. Relay Contacts
 4. Pulse from internal circuit
B. Constant Input Signals
 1. External Switch or Relay Contacts
 2. Circuit Potential
 3. Pulse Train (averaged)

THE SHAFT ENCODER/DECODER

Figure 5:
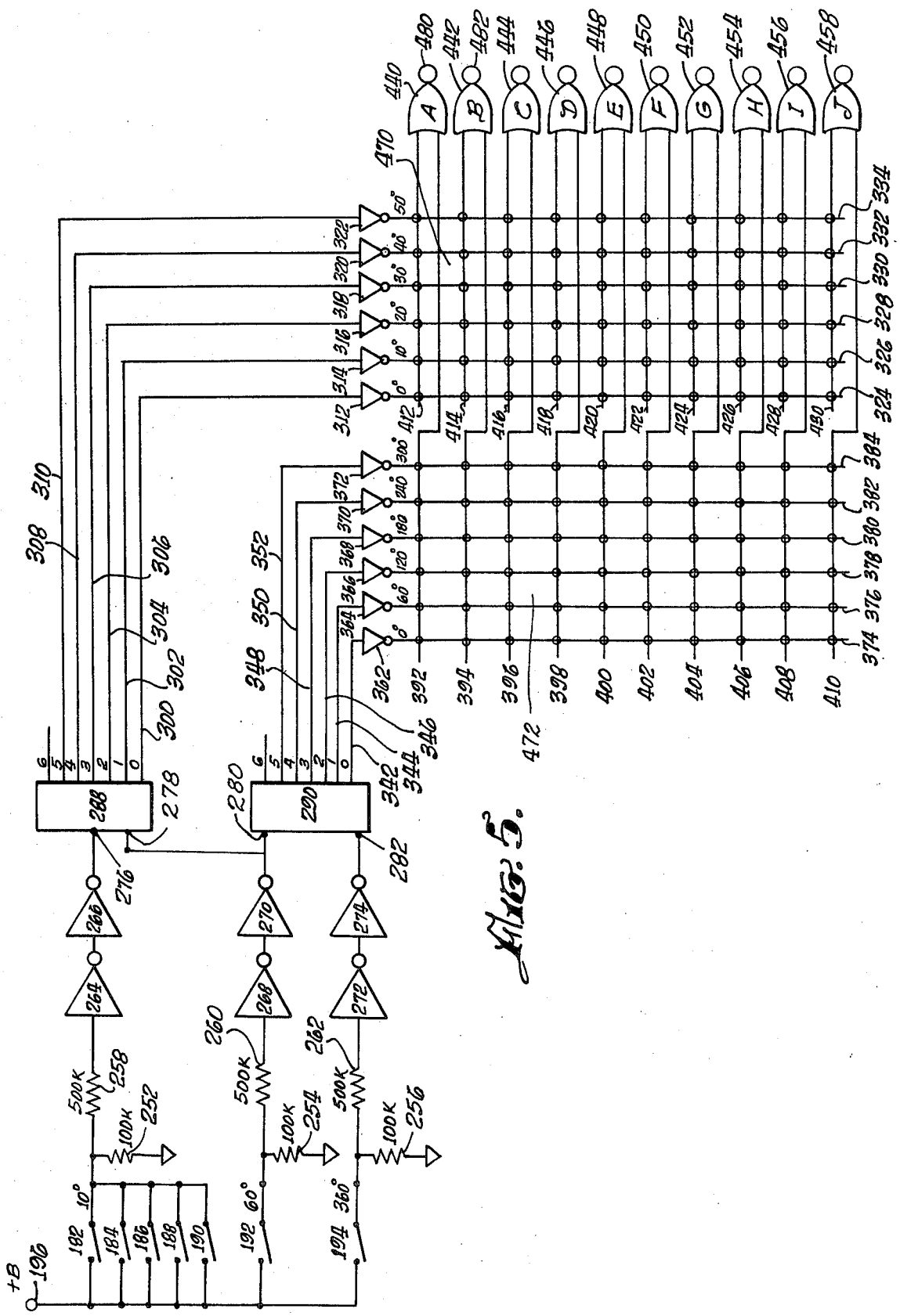
FIG. 5 is an electrical diagram of the presently preferred embodiment of a shaft encoder/decoder suitable for use with the press of FIG. 1.

In FIG. 5 is shown the schematic of the shaft encoder/decoder. A means of generating input pulses at discrete input shaft angles such as the pulse train of FIG. 4) is provided, which, in FIG. 5 is represented by switches 182, 184, 186, 188, 190, 192, and 194. Terminal 196 is connected to B$^+$ (15VDC). The switches make or close at the appointed shaft angles, generating positive pulses across resistors 252, 254, and 256 and through current limiting resistors 258, 260, and 262 to pairs of inverters 264 and 266, and 270, 272 and 274. The inverter pairs serve to shape the input pulse form so the pulses appearing at the inputs 276 and 280 to decode counter/dividers 288 and 290 have steep leading edges. The counters 288 and 290, such as RCA device CD 4017A accept a train of input clock pulses, advancing the 1 of 10 output high (+) condition to the next output conductor for each input clock pulse received. For pulses received at terminal 276, the counter 288 advances its high output successively from conductor 300 to conductor 302 to 304 to 306 to 308 to 310, successively pulsing inverters 312, 314, 316, 318, 320, and 322. Five of the six inverter output conductors 324, 326, 328, 330, 332, and 334 are at a high or positive voltage after any input pulse and one of the six is at a low or zero voltage. A method of selecting which output conductors 324 – 334 are connected to which input conductors 412 – 430 of the NOR gates 440 – 458 is, in this case a matrix pin board 47 which is a 6 by 10 array. The switch 192 makes, generating a pulse which advances counter 290 as in the previous description, providing five of the six conductors 374 – 384 with high signals and one with a low signal. Another matrix pin board 472 is provided for making connection between output conductors 374 – 384 and input conductors 392 – 410 of NOR gates 440 – 458.

Switches 182 – 190 provide pulses at the 10°, 20°, 30°, 40°, and 50° increment of every 60° segment about the center of input shaft rotation. Switch 192 provides a pulse at every 60° of 360° of input shaft rotation, and switch 194 provides a pulse for every 360° of shaft rotation as is shown in FIG. 4. The switches provide a series of pulses which occur, in this embodiment, at 10° intervals, with switch 194 producing a pulse which coincides with and overlaps the pulse produced by switch 192 at its sixth 60° increment (360°).

In operation, the shaft at 0° makes switches 192 and 194, presenting input pulses at terminals 278, 280, and 282. The signal present at 278 resets counter 288 to zero, making output conductor 300 high which is inverted by inverter 312 and makes conductor 324 low. All the other outputs 302 – 310 are low and the conductors 326 – 334 are high. The high signal at terminal 282 of counter 290 overrides the signal at terminal 280 due to the counter's internal logic, thereby resetting counter 290 to zero which produces a high output on conductor 342 and low outputs on conductors 344 – 352, making, through inverters 362 – 372, conductor 374 low and conductors 376 – 384 high. As the shaft rotates to the 10° position, switches 192 and 194 break, removing their signals from the counters, and switch 182 makes with the resultant pulse at terminal 276 advancing counter 288 one step, making conductor 300 low and 302 high. As a result, conductor 326 is low and conductors 324, 328, 330, 332, and 334 are high. As the shaft rotates to the 20° position, switch 182 breaks and switch 184 makes, advancing counter 288 another step which makes 302 low and 304 high, making conductor 328 low and 324, 236, 330, 332, and 334 high. In like manner, conductor 330 becomes the low one at 30°, 332 the low one at 40° and 334 the low one at 50°. At the 60° position, switch 192 is made, producing a pulse at terminals 278 and 280. The signal at 278 resets counter 288 to zero (300 high). The signal at 280 advances counter 290 one step, thereby making conductor 344 high, making conductor 376 low, and 374, 378, 380, 382, and 384 high. As the shaft rotates to the 110° position, switches 182, 184, 186, 188, and 190 make and break in succession every 10°, advancing counter 288 through its steps as before, successively making conductors 326 through 334 low. At the 120° position, counter 290 advances another step making conductor 346 high and 344 low. In like manner, counter 288 advances through its steps and is reset as the shaft is rotated to 180° and counter 290 is advanced one step again. As the shaft rotates to 360°, counter 288 is advanced through its steps and is reset three times while counter 290 is advanced through its remaining two steps (at 240° and 300°) and reset by switch 194 at 360°.

If we take conductors 324 – 334 as corresponding to 10° increments of input shaft rotation, and conductors 374 – 384 as corresponding to 60° increments of input shaft rotation, we have a mechanism for pinning out any 10° shaft angle for operation of any of the NOR gates 440 – 458. For example, a connecting pin in the matrix board 470 at the juncture of conductors 412 and 324, interconnecting them at that point, and a connecting pin in the matrix board 472 at the juncture of conductors 392 and 374 interconnecting them at that point will provide to NOR gate 440, two low input signals at CRM the 0° position of the input shaft, producing a high output from gate 440. During all other 10° positions of shaft rotation, the output of gate 440 will be low. A pin at the juncture of 394 and 374 and another at the juncture of 414 and 326 will produce an output control pulse from NOR gate 442 at the 10° position of input shaft rotation. A pin at the juncture of 396 and 380 and another at the juncture of 416 and 334 will produce an output control pulse from NOR gate 444 at 230°. In like manner, any of the NOR gates 440 – 458 may be selected by connecting pins to produce an output control pulse at any 10° position of the input shaft rotation. Any input line to NOR gates 440 – 458 not selected will produce no output control pulse for the corresponding gate regardless of shaft position.

This combination of switches, counters, inverters, matrix boards and pins and NOR gates provide for selection of 10° shaft positions from 0° – 360°. Other variations are possible.

In the system of FIG. 5, NOR gates 440 and 442 make one pair of ON - OFF control circuits whose outputs occur at selectable angles of input shaft position corresponding to machine main shaft angles. The output of NOR gate 440 is the selectable ON signal, the output of NOR gate 442 is the selectable OFF signal. NOR gates 444 and 446 constitute another pair of ON - OFF control circuits. NOR gates 448 and 450, 452 and 454, and 456 and 453 constitute similar pairs of ON - OFF control circuits with output signals occurring at selectable shaft angles. The number of control circuits is not limited to the number shown.

PULSE RECEIVING CIRCUIT

The purpose of the circuit in FIG. 6 is to receive momentary ON and OFF pulses, translate them into latching SET and RESET outputs and monitor the alternating sequence of ON, OFF, ON, OFF signals and provide a FAULT output signal when an improper sequence occurs such as ON, OFF,---, OFF (ON pulse missing), OFF, ON,---, ON (OFF pulse missing), or when ON and OFF signals are present at the same time (either one or the other continuously energized). When this circuit is used to translate and monitor positive logic signals from two NOR gates such as 440 and 442 (FIG. 5), which are activated alternately, the circuit fault output (normal = +) will fall to zero upon a wrong sequence such as above, or if both ON and OFF signals are received at the same time.

Improper sequence or both ON and OFF signals received at the same time is the result of component failure (i.e., open switch), missing component (i.e., matrix board pin), or spurious signal received due to circuit or component failure or loose contacts or wiring or radio frequency interference. In any of these cases, it is better to stop the machine when any of these faults occur than to permit the machine to continue running with faulty or improper control signals.

Referring to FIG. 6, in which there are seven 2-input NOR gates 494, 496, 498, 500, 502, 504, 516, and three 2-input NAND gates 508, 510 and 512, and an inverter 514, and four buffers 520, 522, 524 and 526; the input terminal 480 receives positive (+) ON pulses from NOR gate 440 (FIG. 5) at the shaft position selectable by one connecting pin in each conductor 392 and 412, and the input terminal 482 receives positive (+) OFF pulses from NOR gate 442 (FIG. 5) at the shaft position selectable by one connecting pin in each conductor 394 and 414 as previously described. Outputs from the circuit in FIG. 6 are SET 484, RESET 486, FAULT NOT 490 and SET and NO FAULT 532.

For purposes of illustration, a connecting pin has been inserted at the junction of conductors 392 and 376 (60°) in matrix board 472 and a connecting pin has been inserted in matrix board 470 at the junction of conductors 412 and 324 (0°) resulting in a positive (+) output pulse from NOR gate 440 on conductor 480 each time the input shaft position passes 60° in the manner previously described. Another connecting pin has been inserted in matrix board 472 at the junction of conductors 394 and 376 (60°) and another connecting pin has been inserted in matrix board 472 at the junction of conductors 414 and 328 (20°) resulting in a positive (+) output pulse from NOR gate 442 on conductor 482 each time the input shaft position passes 80° (60° + 20°) in the manner previously described.

Assuming there is power to the circuit in FIG. 6, and the input shaft position is 0°, in Table 1, the Sequential Logic Truth Table shows the logic condition for each logic element input conductor and output conductor (No. 1– No. 13) in the circuit shown in FIG. 6. The rows 1–13 represent the circuit condition before, during, and after changes caused by input pulses or expected input pulses. Row 1 represents a 0° shaft position at which there are no input pulses present on CRM 480 or 482, therefore No. 1 and No. 2 inputs to 494 and 496 are 0. With no previous pulse history for this circuit, No. 3 and No. 4 (outputs of NORs 494 and 496) are indeterminate (X) and since No. 3 and No. 4 condition affects the rest of this circuitry, all the other conditions are indeterminate (X). During normal operation, this circuit and similar circuits will be fully functioning and determined after the first full revolution of the input shaft as is the shaft encoder in FIG. 5 after once being reset at 0°. One of the purposes of having the operator SINGLE-STROKE the machine for one or more cycles of machine operation before shifting to AUTOMATIC, is to reset all of the sequential circuitry in the controller.

SET and NO FAULT output 532 is a + which is normal.

The other outputs present at this point (70°) in the cycle are: (No. 9) 528 a + indicating the ON 480 signal is OK, (No. 10) 530 a + indicating the OFF 482 signal is OK, and (No. 3) 534 RESET is 0. The 532 output which is SET and NO FAULT can be used to control a relay or triac which would then be energized from the reception of the ON pulse until the OFF pulse is received as long as there is no FAULT. When a FAULT is present (No. 9 or No. 10 or both = 0), No. 11 from 512 becomes + and No. 13 and consequently 532 becomes 0 effectively removing the SET (or OPERATE) output from 532. This is a fail-safe feature of this circuit. 534 RESET output is the inverse of the SET 484 output.

As the input shaft rotates to 80° (row 4), the OFF (+) pulse appears at 482 from NOR 442, making No. 2 a +

TABLE 1

| Row | Shaft Position | Input Pulse | Latched Condition | On 480 No. 1 | Off 482 No. 2 | Reset 486 No. 3 | Set 484 No. 4 | Not 490 No. 5 | No. 6 | No. 7 | No. 8 | No. 9 | No. 10 | No. 11 | Fault Fault 532 No. 12 | Set & No Fault No. 13 |
|---|---|---|---|---|---|---|---|---|---|---|---|---|---|---|---|---|
| 1 | 0° |  |  | 0 | 0 | X | — | — | — | — | — | — | — | — | — | — |
| 2 | 60° | On(480) | Set(484) | + | 0 | 0 | + | 0 | 0 | X | — | — | — | — | — | — |
| 3 | 70° |  | Set(484) | 0 | 0 | 0 | + | + | 0 | 0 | + | + | + | 0 | + | + |
| 4 | 80° | Off(482) | Reset(486) | 0 | + | + | 0 | 0 | 0 | 0 | + | + | + | 0 | + | 0 |
| 5 | 90° |  | Reset(486) | 0 | 0 | + | 0 | 0 | + | + | 0 | + | + | 0 | + | 0 |
| 6 | 60° | On(480) | Set(484) | + | 0 | 0 | + | 0 | 0 | + | 0 | + | + | 0 | + | + |
| 7 | 70° |  | Set(484) | 0 | 0 | 0 | + | + | 0 | 0 | + | + | + | 0 | + | + |
| 8 | 80° | Off(482) | Reset(486) | 0 | + | + | 0 | 0 | 0 | 0 | + | + | + | 0 | + | 0 |
| 9 | 90° |  | Reset(486) | 0 | 0 | + | 0 | 0 | + | + | 0 | + | + | 0 | + | 0 |
| 10 | 60° |  | Reset(486) | 0 | 0 | + | 0 | 0 | + | + | 0 | + | + | 0 | + | 0 |
| 11 | 70° |  | Reset(486) | 0 | 0 | + | 0 | 0 | + | + | 0 | + | + | 0 | + | 0 |
| 12 | 80° | Off(482) | Reset(486) | 0 | + | + | 0 | 0 | 0 | + | 0 | 0 | + | + | 0 | 0 |

Now, as the input shaft rotates from 0°, the preselected ON pulse appears at 480 at 60°. In Table 1 and FIG. 6, a + into No. 1 of 494 forces No. 3 to 0, No. 3 and No. 2 both 0 into 496 makes No. 4 a +, No. 1 a + into 498 makes No. 5 a 0, No. 4 a + into 500 makes No. 6 a 0. SET output 484 No. 4 is a + and RESET output 486 No. 3 is a 0. Input lines No. 5 and No. 6 into 502 and 504 going to 0 will not have any effect on outputs No. 7 and No. 8, so at this point, not having known their previous condition, those outputs and the condition of the rest of the circuitry is still indeterminate (X).

As the input shaft moves to 70°, the ON (+) pulse at 480 goes to 0 making No. 1 a 0. Since No. 4 was a + making No. 3 a 0 and No. 2 is still 0, No. 4 remains a + and gates 494 and 496 are latched in that condition. Since No. 1 is now a 0 and No. 3 is still a 0 into 498, No. 5 becomes a +. No. 4 is still a + into 500, so No. 6 remains at 0. No. 5 a + into 502 forces No. 7 to 0, and since No. 6 into 504 is also 0, No. 8 becomes a +. Since No. 7 and No. 2 are 0 into 508, No. 9 is a +. No. 8 a + and No. 1 a 0 into 510 makes No. 10 a +. No. 9 through 520 = (No. 9) 528 is + and No. 10 through 522 = (No. 10) 530 is +. No. 9 and No. 10 both + into 512 makes No. 11 a 0 into 514 which makes No. 12 a +. No. 3 and No. 11 both 0 into 516 makes No. 13 a + through 524 = (No. 13) 532 a +. At this point, the circuit of FIG. 6 is fully functional: the ON pulse at 60° latched the SET output 484 on (+) and RESET output 486 off (0) and at 70°, with the 480 ON (+) pulse cessation, the FAULT NOT output 490 is a + which is normal and the into 496 which makes No. 4 a 0. A 0 on No. 1 and No. 4 into 494 makes No. 3 a +, latching RESET output 486 on (+) and SET output 484 off (0). No. 3 a + into 498 makes No. 5 a 0, No. 2 a + into 500 makes No. 6 a 0, No. 5 and No. 6 both 0 into 502 and 504 does not change their latched condition, so No. 7 remains 0 and No. 8 a +. No. 7 a 0 and No. 2 a + into 508 make No. 9 a +. No. 1 a 0 and No. 8 a + into 510 makes No. 10 a +. No. 9 and No. 10 both + into 512 make No. 11 a 0. No. 11 a 0 into 514 makes No. 12 490 a +. No. 3 a + into 516 makes 532 a 0. All normal.

As the input shaft rotates to 90°, the OFF (+) pulse at 482 goes to 0 making No. 2 into 496 a 0. Since No. 3 is still a +, No. 4 is still 0 and since No. 1 is still 0, No. 3 is a + which is a latched condition for the SET and RESET outputs. But now that No. 2 and No. 4 into 500 are 0, No. 6 becomes a +. No. 3 a + into 498 still makes No. 5 a 0. No. 6 a + into 504 makes No. 8 a 0 and No. 5 and No. 8 both 0 into 502 makes No. 7 a +. No. 7 a + and No. 2 a 0 into 508 make No. 9 a + and No. 1 and No. 8 both 0 into 510 make No. 10 a +. No. 9 a + and No. 10 a + into 512 make No. 11 a 0 and No. 12 a + as before. No. 3 a + still makes 532 a 0.

As the input shaft rotates from 90° around the circle, no input occurs at 480 or 482 until at 60°, the ON pulse again appears at 480 making No. 1 a + into 494 forcing No. 3 to 0. No. 3 a 0 and No. 2 a 0 make 496 output No. 4 a +. No. 4 a + into 494 latches No. 3 at 0. The SET output 484 is once again latched on (+) and the RESET output 486 latched off (0). No. 1 a + into 498 makes No. 5 remain 0 No. 4 a + into 500 makes No. 6 a 0. No. 6 changing from + to 0 has no effect on latched gates 502 and 504, so No. 7 remains + and No. 8 remains 0. No. 7 a + and No. 2 a 0 into 508 makes No. 9 a +, No. 1 a + and No. 8 a 0 into 510 makes No. 10 a +. No. 9 a + and No. 10 a + makes No. 11 a 0 and No. 12 a + as before. No. 3 and No. 11 both 0 into 516 make 532 a +.

At 70°, 480 goes to 0 making No. 1 a 0 which doesn't affect latched NORs 494 and 496, but No. 1 a 0 and No. 3 a 0 into 498 makes No. 5 a +. No. 4 still a + into 500 holds No. 6 at 0. No. 5 a + into 502 forces No. 7 to 0 and with No. 6 a 0 into 504 makes No. 8 a + which is a latched condition for NORs 502 and 504. No. 7 and No. 2 both 0 into 508 make No. 9 a +. No. 1 a 0 and No. 8 a + into 510 make No. 10 a +. No. 9 and No. 10 both + into 512 make No. 11 a 0 and No. 12 a + as before. 532 remains +.

Row 7 (70°) is identical to row 3 (70°) and if the same normal sequence (per this example) of pulses occur again, row 8 (80°) will be identical to row 4 (80°), row 9 (90°) will be identical to row 5 (90°) etc. However, one of the main purposes of this circuit is to indicate a fault condition.

Therefore, suppose in row 10 (at 60°), for some cause, say, the connecting pin at the junction of conductors 392 and 376 in matrix board 472 is removed or is missing and the ON pulse fails to appear at 480 when the input shaft passes 60°. In row 10, then, with no input pulse present, there is no change in any of the circuit conditions. Therefore row 10 is identical to row 9. At 70°, there is no signal either, so row 11 is identical to row 9 also. At 80°, however, the OFF pulse appears at 482, making No. 2 a + into 496, but No. 3 into 496 was already a + making No. 4 a 0, so there is no change in the latched condition of NORs 494 and 496, and the RESET output 486 remains on (+) and the SET output 484 remains off (0). No. 2 a + into 500 makes No. 6 a 0 which has no effect on the latched condition of NORs 502 and 504, so No. 7 remains + and No. 8 remains 0. No. 1 a 0 and No. 8 a 0 make No. 10 a +, but now No. 7 is a + and No. 2 is a + into 508 making No. 9 a 0. No. 9 and No. 10 a + into 512 makes No. 11 a + and No. 12 a 0, indicating a fault.

The loss of the + at No. 12 caused by the improper sequence can be used as a signal to shut the machine down and indicate a fault condition at the status panel so an operator can investigate and find the problem. During the rotation from 80° (row 8) to 80° (row 12), (No. 13) 532 has remained 0.

Since this circuit is symmetrical for the ON and OFF input pulses and conditions, if the OFF pulse is missing (instead of the ON pulse as in the example above), the circuit will indicate a fault as above when the next ON pulse appears, in which case No. 1 and No. 8 will both be + into 510 causing No. 10 to be 0. No. 9 a + and No. 10 a 0 will make No. 11 a + and No. 12 a 0 indicating the fault as above. No. 11 a + into 516 will force 532 to 0.

In the case where both ON and OFF pulses appear simultaneously at 480 and 482 (i.e., if the ON pulse remains due to a faulty circuit until the OFF pulse appears), inspection of columns No. 7 and No. 8 will show that either No. 7 is -- or No. 8 is + at any given condition of the circuit after it has been reset or run through. If No. 7 OR No. 8 is + AND No. 1 AND No. 2 (480 and 482) are + then EITHER No. 2 AND No. 7 are + OR No. 1 AND No. 8 are + making No. 9 a 0 OR No. 10 a 0 resulting in No. 11 a + and No. 12 a 0 as in the previously described fault above. (No. 7 + No. 8) (No. 1 · No. 2) = (No. 2 · No. 7) + (No. 1 · No. 8) for this circuit. Again 532 is forced to 0.

In FIG. 6, there are several circuit portions which rely upon gate propagation delay to insure full effectiveness. One example is the transition from row 5 to row 6 circuit conditions upon receiving the ON pulse at No. 1 into 494. The previous condition was (row 5) No. 3 a + into 496, No. 4 a 0 into 494. No. 1 was 0 and No. 2 was 0 and NORs 494 and 496 were latched at No. 4 a 0, No. 3 a +. No. 3 a + and No. 1 a 0 into 498 made No. 5 a 0. When No. 1 becomes a + during ON pulse at 480, No. 3 becomes a O CRM after the inherent delay through the internal circuits of NOR 494 (in RCA CD 4000 series, about 25 ns (nanoseconds). Prior to No. 3 becoming a 0, No. 1 a + is immediately seen at the other input to 498, momentarily overlapping the No. 3 + signal and thereby effectively holding No. 5 at 0 with no spurious signals emanating during that transition.

Another transition is in rows 6 and 7 when No. 1 is a +, No. 3 a 0, No. 8 into 510 a 0. No. 1 goes to 0 and 25 ns later 498 makes No. 5 a + into 502. 25 ns later No. 7 goes to 0 (No. 6 is already 0), so 25 ns later 504 makes No. 8 a +. But, No. 8 into 510 became a + 3 gate delays, or 75 ns after No. 1 went to 0, therefore there was no spurious drop in No. 10 + signal to disturb the SET and NO FAULT and FAULT NOT output conditions. Gates 500 and 508 also depend upon inherent delays for proper operation as in the above example.

SAMPLING, RESET AND RUN CIRCUIT

FIG. 7 shows the Sampling, Manual Reset and Run output circuits. Table 2 is the Sequential Logic Truth Table for FIG. 7.

In FIG. 7, there are 5 inverters 600, 620, 636, 638 and 640; eleven 2 input NORs 602, 604, 608, 610 612, 614, 616, 622, 624, 628 and 630; one 3 input AND 606, one 2 input AND 632, one 2 input NAND 618, one 4 input NAND 626 and one Buffer 634. The inputs to this circuit are RESET 486, LATCHED SENSOR SIGNAL 586 CRM, FAULT NOT 506, an extra RUN input 650, an extra sampled input 652, a N.C. input for sampling 654, a N.C. input to the RUN circuit 656, time delayed RESET 666, and a MANUAL RESET input 658. Outputs are RUN 660, RESET 662, N.C. (Instant Stop) 664, and N.C. (Delayed Stop) 668. An input 484 and output 484 is not connected in this circuit.

In operation, 506 is + as long as there is no FAULT (FIG. 6), but with no previous history, 506 is X. For this example, 650, 652 and 666 are held +. At 0°, with no prior history, 586, 486 and all outputs are X. 654 and 656 are now

TABLE 2

| | | | L. SIG. 586 | | NCD IN 652 | MAN. RESET 654 | NCI IN 658 | | 656 | 50 | 54 | 56 | 58 | RESET 486 | 60 | 62 | 64 | 66 | 68 | 70 |
|---|---|---|---|---|---|---|---|---|---|---|---|---|---|---|---|---|---|---|---|---|
| 1 | 0° | | X | | + | + | + | | + | 0 | + | 0 | X | | | | | | | |
| 2 | 60° | Set | X | | | | 0 | | | | | | X | 0 | X | | | | | |
| 3 | 70° | L. Sig 586 | + | | | | + | | | | | | + | 0 | + | 0 | 0 | + | 0 | + |

TABLE 2-continued

| | | | | | | | | | | | | | | | | | |
|---|---|---|---|---|---|---|---|---|---|---|---|---|---|---|---|---|---|
| 4 | 80° | Reset | 0 | ↓ | 0 | ↓ | ↓ | ↓ | 0 | + | 0 | + | 0 | + | 0 | + |
| 5 | 60° | Set | 0 | | 0 | | | | 0 | 0 | 0 | + | 0 | + | 0 | + |
| 6 | 70° | L. Sig 586 | + | | 0 | | | | + | 0 | + | 0 | 0 | + | 0 | + |
| 7 | 80° | Reset | 0 | | 0 | | | | 0 | + | 0 | + | 0 | + | 0 | + |
| 8 | 60° | Set | 0 | | 0 | | | | 0 | 0 | 0 | + | + | 0 | + | + |
| 9 | 70° | — | 0 | | 0 | | | | 0 | 0 | 0 | + | + | 0 | + | + |
| 10 | 80° | Reset | 0 | ↓ | 0 | ↓ | | | 0 | + | 0 | + | 0 | + | 0 | |

| | | | | | | | FAULT NOT | | | | | | RUN | RESET | NCI OUT | NCD OUT |
|---|---|---|---|---|---|---|---|---|---|---|---|---|---|---|---|---|
| | | | 72 | 74 | 76 | 650 | 506 | 666 | 80 | 82 | 84 | 86 | 660 | 662 | 664 | 668 |
| 1 | 0° | | 0 | + | 0 | + | X | + | X | | | | ———————————→ | | + | + |
| 2 | 60° | Set | 0 | + | 0 | + | X | | X | | | | | | | |
| 3 | 70° | L. Sig 586 | 0 | + | 0 | + | + | | + | 0 | + | 0 | + | 0 | | |
| 4 | 80° | Reset | 0 | + | 0 | + | + | | 0 | 0 | + | 0 | + | 0 | | |
| 5 | 60° | Set | 0 | + | 0 | + | + | | | 0 | + | 0 | + | 0 | | |
| 6 | 70° | L. Sig 586 | 0 | + | 0 | + | + | | | 0 | + | 0 | + | 0 | | |
| 7 | 80° | Reset | 0 | + | 0 | + | + | | | 0 | + | 0 | + | 0 | | |
| 8 | 60° | Set | 0 | + | 0 | + | + | | | 0 | + | 0 | + | 0 | | |
| 9 | 70° | — | 0 | + | 0 | + | + | | | 0 | + | 0 | + | 0 | | |
| 10 | 80° | Reset | + | 0 | + | + | | ↓ | | 0 | + | 0 | + | | ↓ | ↓ | connected by means of a N.C. switch to the positive power supply that serves this circuit. 654 a + into 600 makes No. 50 a 0. 656 a + into 620 makes No. 72 a 0. The MANUAL RESET button is actuated making 658 a + into 604 and 624, making No. 56 a 0 and No. 75 a 0. No. 50 and No. 56 both 0 into 602 makes No. 54 a + latching 602 and 604 in that condition and providing a + input to 606. No. 72 a 0 and No. 76 a 0 into 622 makes No. 74 a +, latching 622 and 624 in that condition and providing a + input to 626. NCD output 668 from 610 is + due to No. 56 a 0. NCI output 664 from 638 is + due to No. 76 a 0.

The MANUAL RESET button is released, and as long as 654 and 656 inputs remain +, their latched NORs will remain latched. No. 58 and the rest of the circuit is X. The machine will have to be cycled in order to reset the rest of the circuitry. At 60°, the SET condition appears on 484, but is not connected to the circuit in FIG. 7. RESET 486 is 0. At 70°, the LATCHED SENSOR SIGNAL is + at 586. With 652, No. 54 and 586 all + into 606, No. 58 is +. No. 58 + into 610 makes No. 62 0, No. 62 and No. 3 both 0 into 608 makes No. 60 a + latching 608 and 610, and making No. 64 a 0. No. 58 a + into 616 makes No. 68 a 0, No. 68 and No. 64 both 0 into 614 makes No. 66 a +, latching 614 and 616. 486 CRM a 0 and No. 68 a 0 into 618 makes No. 70 a +. 506 at 70° is +, 650 already +, now No. 70 and No. 74 a + into 626 makes No. 82 a 0. At this point, the machine can be halted for resetting.

Under the above conditions, if the MANUAL RESET button is pushed momentarily, 658 will be + again and will not affect the latched condition of 602 and 604 or 622 and 624. But 658 and 666 both + into 632 make No. 80 +. No. 80 a + into 630 makes No. 86 a 0. No. 82 and No. 86 both 0 into 628 makes No. 84 + and 660 + through 634. No. 84 a + into 636 makes 662 a 0. As the machine is advanced to 80°, RESET 486 becomes +. The RESET signal (per FIG 8) removes LATCHED SENSOR SIGNAL at 586 which then becomes 0, causing No. 58 out of 606 to be 0. No. 486 a + into 608 makes No. 60 a 0, No. 60 and No. 58 both 0 into 610 makes No. 62 a +, latching 608 and 610. 486 a + and No. 60 a 0 into 612 maintains No. 64 a 0 so no change occurs for the previously latched 614 and 616 (No. 66 and No. 68 remain the same). No. 486 a + and No. 68 a 0 into 618 maintains No. 70 a +. There is no change in the remainder of the circuit. A LATCHED SENSOR SIGNAL thus has been received, sampled and reset and the RUN output 660 during that evolution has remained +.

As the machine continues on its cycle, barring faults or open circuits, nothing occurs until the SET condition at 60° which makes RESET 486 a 0. A change from + to 0 on the input of 608 not change the latched condition of 608 and 610 and No. 60 and No. 62 remain the same as before. 586 is still 0, making No. 58 a 0. No. 60 a 0 and 486 a 0 into 612 make No. 64 a +, making No. 66 a 0. No. 66 and No. 58 both 0 into 616 make No. 68 a +, latching 614 and 616 in that condition. 486 a 0 and No. 68 a + into 618 make No. 70 a + as before and no further change in circuit condition occurs.

At 70° again, 586 becomes + and with 652 still a + and 654 still a + (No. 54 a +) into 606, No. 58 becomes +. No. 58 a + into 610 makes No. 62 0. No. 486 a 0 and No. 62 a 0 into 608 makes No. 60 a +. No. 60 a + into 612 makes No. 64 a 0. No. 58 a + into 616 makes No. 68 a 0. Both No. 64 and No. 68 0 into 614 makes No. 66 a +, latching 614 and 616. 486 a 0 and No. 68 a 0 into 618 makes No. 70 + as before and no further change occurs.

At 80°, RESET 486 is + once more, 586 goes to 0, No. 58 to 0 and 486 + into 608 makes No. 60 a 0. Both No. 58 and No. 60 0 into 610 makes No. 62 a +, latching 608 and 610. 486 at + into 612 makes No. 64 remain 0. No change in the latched condition of 614 and 616 occurs, causing No. 66 and No. 68 to remain the same. 486 a + and No. 68 a 0 into 618 maintains No. 70 a + as before and no further change occurs. No further signals come in until 60° and the SET condition occurs, which in row 8 would be identical to row 5.

This time at 70°, the probe, say, does not make contact with the strip and LATCHED SENSOR SIGNAL 586 + does not appear. Then row 9 (70° with no 586 +) will be the same as row 8 because no other change in input signals has appeared. No. 586 a 0 into 606 makes No. 58 a 0. At 80° when RESET 486 becomes +, no change occurs in 608 and 610, No. 60 and No. 62 remaining the same, but a + into 612 makes No. 64 a 0 which has no effect on the condition of latched 614 and 616, so No. 66 remains 0 and No. 68 a +. 486 a + and No. 68 a + into 618 makes No. 70 a 0 and No. 70 a 0 into 626 causes No. 82 to be + into 628 which forces No. 84 to 0 and 660 to 0. Thus when the sampled signal 586 was missing, the RUN output 660 went to 0 when the RESET condition appeared.

SENSOR SIGNAL CIRCUIT

FIG. 8 is the Sensor Signal Receiving circuit. The purpose of this circuit is to receive and hold a sensor signal when the signal conforms to one of the following sets of conditions: A. Received after SET signal 484 +, sensor signal is first +, then 0; B. Received after SET signal 484 +, sensor signal is first 0, then +; C. Received after prior signal 552 +, then A or B above. Table 3 is the sequential logic truth table for A condition above.

In FIG. 8, there is 1 OR 562, 1 XOR 564, 2 2-input NANDs 566 CRM and 589 CRM, 6 2-input NORs 570, 572, 574, 576, 578 and 580, and 3 inverters 568, 582 and 588.

Inputs are SENSOR SIGNAL at 556, SET 484, RESET 486, N.O./N.C. 554, PRIOR signal 552 and SEQUENTIAL (O)/NON-SEQUENTIAL (+) 550. Outputs are LATCHED SENSOR SIGNAL 586 and 558, and MOMENTARY SIGNAL 560. In this example (A), input 550 is held at +, which removes the requirement for a + PRIOR signal 552, since, if 550 is always +, No. 26 is always + to 566, regardless of the condition of 552. Also, 554 is held at 0 to require the signal at 556 to be N.O. or open-before-short (+ before 0) for an acceptable signal on each machine cycle.

The numbers No. 3, No. 4, and No. 20 through No. 36 refer to the conductors connecting the logic in FIG. 8, and, in Table 3, show the logic level for the various input conditions in FIG. 8 corresponding to machine shaft angle such as was described previously for FIG. 6 and Table 1.

TABLE 3

| | | | 556 No. 20 | N.O./N.C. 554 No. 21 | No. 22 | No. 23 | SEQ/-SEQ 550 No. 24 | PRIOR SIG. 552 No. 25 | No. 26 | SET 484 No. 4 | No. 27 | No. 28 |
|---|---|---|---|---|---|---|---|---|---|---|---|---|
| 1 | 0° | Set | + | 0 | + | 0 | + | + | + | X | — | — |
| 2 | 60° | 484 Probe | + | 0 | + | 0 | + | + | + | + | 0 | + |
| 3 | 70° | 556 Reset | 0 | 0 | 0 | + | + | + | + | + | 0 | 0 |
| 4 | 80° | 486 | 0 | 0 | 0 | + | + | + | + | 0 | + | 0 |
| 5 | 90° | | 0 | 0 | 0 | + | + | + | + | 0 | + | 0 |
| 6 | 170° | | + | 0 | + | 0 | + | + | + | 0 | + | 0 |
| 7 | 60° | Set 484 Probe | + | 0 | + | 0 | + | + | + | + | 0 | + |
| 8 | 70° | 556 Reset | 0 | 0 | 0 | + | + | + | + | + | 0 | 0 |
| 9 | 80° | 486 | 0 | 0 | 0 | + | + | + | + | 0 | + | 0 |
| 10 | 90° | | 0 | 0 | 0 | + | + | + | + | 0 | + | 0 |
| 11 | 170° | | + | 0 | + | 0 | + | + | + | 0 | + | 0 |
| 12 | 60° | Set 484 | + | 0 | + | 0 | + | + | + | + | 0 | + |
| 13 | 70° | — | + | 0 | + | 0 | + | + | + | + | 0 | + |
| 14 | 80° | Reset 486 | + | 0 | + | 0 | + | + | + | 0 | + | 0 |

| | | | RESET 486 No. 3 | No. 29 | No. 30 | No. 31 | No. 32 | LATCHED SIG. 586 No. 33 | LATCHED SIG. 558 No. 34 | No. 35 | MOMENTARY SIG. 560 No. 36 |
|---|---|---|---|---|---|---|---|---|---|---|---|
| 1 | 0° | Set | | | | | | | | | →|
| 2 | 60° | 484 Probe | 0 | 0 | + | 0 | X | | | | → |
| 3 | 70° | 556 Reset | 0 | 0 | + | + | 0 | + | + | 0 | + |
| 4 | 80° | 486 | + | + | 0 | 0 | + | 0 | 0 | + | 0 |
| 5 | 90° | | + | + | 0 | 0 | + | 0 | 0 | + | 0 |
| 6 | 170° | | + | + | 0 | 0 | + | 0 | 0 | + | 0 |
| 7 | 60° | Set 484 Probe | 0 | 0 | + | 0 | + | 0 | 0 | + | 0 |
| 8 | 70° | 556 Reset | 0 | 0 | + | + | 0 | + | + | 0 | + |
| 9 | 80° | 486 | + | + | 0 | 0 | + | 0 | 0 | + | 0 |
| 10 | 90° | | + | + | 0 | 0 | + | 0 | 0 | + | 0 |
| 11 | 170° | | + | + | 0 | 0 | + | 0 | 0 | + | 0 |
| 12 | 60° | Set 484 | 0 | 0 | + | 0 | + | 0 | 0 | + | 0 |
| 13 | 70° | — | 0 | 0 | + | 0 | + | 0 | 0 | + | 0 |
| 14 | 80° | Reset 486 | + | + | 0 | 0 | + | 0 | 0 | + | 0 |

In operation, there are supply voltages and currents to the circuits shown and they are assumed to operate in the prescribed logical manner according to the symbols used. No. 556 is at + and is lowered to a 0 signal level when the probe, connected by wire, contacts the strip thereby providing a ground connection.

At 0°, then, No. 20 is +, No. 21 a 0 into 564 makes No. 22 a + into 568, making No. 23 a 0 into 570. 550 and 552 being held + give No. 24 a + and No. 25 a + into 562 making No. 26 a + into 566. Since no previous history is known for the condition of the circuit and logic levels shown in FIG. 6 and Table 1, No. 4, No. 3 and No. 27 through No. 36 are X. At 60°, 484 conveys a + to the other input of 566, making No. 27 a 0. Since No. 23 and No. 27 are both 0 at 60° into 570, No. 28 becomes a +. Per FIG. 6 and Table 1, when No. 4 is +, No. 3 is 0. No. 28 a + into 572 makes No. 29 a 0, No. 29 and No. 3 both 0 into 574 makes No. 30 a +, latching 572 and 574 in that condition. No. 28 a + into 576 makes No. 31 a 0 and with no previous history, No. 32 through No. 36 are X.

With the 60° conditions per row 2, the circuit in FIG. 8 has been partially readied for the reception of a 0 signal at 556. For the purpose of this example, the 0 signal at 556 will occur at the 70° shaft position on each cycle of machine operation, unless something interferes with its occurrence. At 70°, therefore, No. 20 into 564 goes to 0 when the probe contacts the strip, making No. 22 0 into 568, making No. 23 a + into 570 making No. 28 a 0. No. 28 becoming 0 has no affect on the latched condition of 572 and 574, but No. 28 a 0 and No. 29 a 0 into 576 makes No. 31 a + into 578 making No. 32 a 0. No. 3 a 0 and No. 32 a 0 into 580 makes No. 33 a +, latching 578 and 580 in that condition. No. 33 a + makes output 586 + and both No. 33 and No. 23 + into 589 makes No. 35 0 into 588 which makes No. 36 output 560 a +. No. 32 a 0 into 582 makes No. 34 output 558 a +. So, with the reception of a + on 484, and 0 on 556 after a + on 556, the outputs 586, 558 and 560 are all +.

At 80°, SET No. 4 goes to 0 and RESET No. 3 is +. When No. 4 into 566 is 0, No. 27 is + into 570. No. 28 is still 0 but No. 3 into 574 is + making No. 30 a 0. Both No. 28 and No. 30 0 into 572 makes No. 29 into 576 a +, making No. 31 a 0. No. 3 a + into 580 makes No. 33 a 0. No. 31 and No. 33 both 0 into 578 makes No. 32 a +. No. 32 a + into 580 latches 578 and 580 in that condition. No. 23 a + and No. 33 a 0 into 589 makes No. 35 a + and No. 36 a 0. No. 32 is + into 582 making No. 34 a 0. So, with the reception of a + RESET signal on 486, outputs 586, 558 and 560 go to 0.

As the machine advances to 90°, none of the input conditions change, so the circuit logic levels remain the same. AT 170°, however, the finished piece which was contacting the probe is cut off, removing the 0 signal at 556, and No. 20 returns to +. No. 20 a + and No. 21 a 0 makes No. 22 a + and No. 23 a 0. Since No. 4 is still 0 and No. 26 a +, No. 27 is + maintaining No. 28 at 0 and preventing any further change in circuit conditions.

No other inputs change condition until the machine arrives at 60° shaft angle. At 60°, No. 4 becomes + and No. 3 becomes a 0. No. 4 a + and No. 26 a + into 566 make No. 27 a 0. No. 27 and No. 23 both 0 into 570 make No. 28 a + into 572 making No. 29 a 0. No. 3 and No. 29 both 0 into 574 make No. 30 a +, latching 572 and 574 in that condition once more. No. 28 a + into 576 holds No. 31 at 0 when No. 29 goes to 0. There is no change in 578 or 580 or the outputs 586, 558 and 560.

At 70°, again the probe signal goes to 0 making No. 20 a 0 into 564, No. 22 a 0 into 568 and No. 23 a + into 570, making No. 28 a 0 which doesn't change the latched 572 and 574, but both No. 28 and No. 29 0 into 576 makes No. 31 a +, making No. 32 a 0 and with No. 3 a 0 makes No. 33 a +. No. 23 and No. 33 + makes No. 35 a 0 and No. 36 a +. No. 32 a 0 makes No. 34 +.

Once again, upon reception of the signals as in A above, the outputs 586, 558 and 560 are +. Line 8 (70°) duplicates line 3 (70°). Similarly, line 9 (80°) will duplicate line 4 (80°), line 10 (90°) will duplicate line 5 (90°), line 11 (170°) will duplicate line 6 (170°), and line 12 (60°) will duplicate line 7 (60°). This time at 70°, if the stock doesn't feed far enough in the die and fails to contact the probe, No. 20 will remain + and with no other changes in input conditions, the circuit condition in line 13 will be the same as in line 12. No + condition appears at outputs 586, 558 and 560.

At 80° when the RESET signal arrives, No. 4 becomes 0, No. 3 becomes + effectively resetting 572 and 574, and 578 and 580 as in lines 4 and 9. The circuit thus has neither stored nor delivered an output signal, but has been reset and ready for the reception of proper input conditions as in A above.

In the case where the probe signal No. 20 goes to + before the RESET No. 3 signal is present, No. 22 will be +, No. 23 a 0 into 589 will make No. 35 a + and No. 36 a 0, while not affecting the state of the two latched pairs 572 and 574, and 578 and 580. So, output 560 will have an output if and only if the input signal No. 20 and the other inputs meet the conditions in A above and only while the input signal No. 20 is present. The other outputs 586 and 558 are latched until reset.

SINGLE SENSOR MONITORING

FIG. 9 illustrates a control circuit for monitoring one cyclic sensor and other N.C. circuits, providing status indication for control of a device. The system of FIG. 9 includes one each of the circuits of FIGS. 6, 7 and 8.

In FIG. 9, the circuit is connected to a + supply source 698 and a ground return 696, and various input and output devices in order to provide a system, in this example, which monitors one sensor input signal such as from a probe feed sensor on a punch press, provides status indication with lamps, and controls the punch press RUN relay, stopping the machine when a misfeed occurs. The configuration of FIG. 9 also monitors other input signals as will be described.

In FIG. 9, a N.O. switch 700, actuated by a cam on the main shaft of the machine, is connected to input 480. Another N.O. switch 702 actuated by the same cam is connected to 482, providing ON and OFF pulses similar to those previously described. N.C. switch 704 is connected to 650 and will provide a STOP (loss of RUN output 660) signal immediately upon opening and, for instance, may be used to stop the machine when the operator violates a safety barrier. N.C. switch 710 will also stop the machine immediately upon opening and the consequent 0 input to 620 (FIG. 7) making No. 72 + into 622 forcing No. 74 to 0 into 626 causing No. 82 a + into 628 to make No. 84 and RUN output 660 a 0, and No. 76 a + into 638 forcing 664 to 0. 664 at 0, connected through lamp 750 to + supply 696, lights the NCI (Normally Closed, Instant stop) lamp 750. Switch 710 may be such as the PILOT switch in the die.

N.C. switches 706 and 708 are connected to 652 and 654 which provide for similar functions as 704 and 710 with the exception that the response is not immediate but takes place with the sampling RESET condition as previously described. 708 opening trips latching NORs 602 and 604, providing an NCD (Normally Closed Delayed stop) indication by means of lamps 752. Switches 706 and 708 may monitor such conditions as buckling or stock depleted. Note that a short to ground 696, of any of the switches 704, 706, 708, 710 or the terminals 650, 652, 654 or 656 will produce the same circuit action as an open switch. In practice, a current limiting resistor such as 760 is used in these circuits to limit short circuit current.

Momentary push button switch 712 is a Manual Reset switch for the purpose of resetting latching circuits 602 and 604 (NCD), 622 and 624 (NCI), and 628 and 630 (RUN). A toggle switch 714 is, in this example, providing a + input to 550 which makes No. 26 out of 562 + regardless of the level of 552. Therefore no PRIOR signal 552 is required to enable SET gate 566. A toggle switch 718 is, in this example, providing a + input to 554 which selects the N.C. mode (probe 728 must be shorted to ground initially, then open after the SET condition starts in order to produce a signal which can latch 586 and 558 in FIG. 8 for input 556. A lamp 745 connected between 558 and ground 696 provides visible indication to the operator of a latched sensor signal. A 0 input to 554 would select the N.O. mode for input 556. Resistors 716 and 720 provide a grounded input to 550 and 554 in the case where switches 714 and 718 are open. This is a typical configuration for some types of logic circuit input requirements.

The resistance network comprised of 726, 722 and 724, in ratios respectively of 1:10:50, provides a current limited + input signal to 556 when sensor 728, such as an end of feed probe, is not contacting the strip and provides a supply current limited 0 logic level which is approximately 9 percent of the supply voltage when sensor 728 is contacting ground.

When switch 700 fails open or fails closed, as previously described, output 528 becomes 0 upon closure of switch 702, lighting lamp 730 with supply current from 698. Similarly, lamp 732 is energized when switch 702 fails open or fails closed upon closure of switch 700. Lamp 734 is energized when either switch 700 or 702 fails open or fails closed upon closure of the alternate switch.

Run output 660 controls a solid state relay 736, such as Douglas Randall D 12 B, one of the output terminals 738 connected to punch press control power and the other 740 supplying the RUN relay coil 762. When output 660 is +, it supplies power to energize 736. Output 662, a 0 when 660 is +, will energize RUN lamp 764. The operator must then have the JOG-SINGLE STROKE-RUN control in RUN and then press the RUN push buttons to make punch press control power available at 738 which will then energize the RUN relay.

Output 662 and resistor 742 and capacitor 744 provide a time-delayed RESET signal at 666 which prevents an operator from manually resetting Run output 660 until after a prescribed waiting period. The waiting period induces the operator to investigate the reason for machine stoppage, since he must wait for a period anyway.

In operation, and in the RUN condition, 660 is + and 662 is 0. Diode 746 and resistor 748 quickly discharge capacitor 744. While the machine is running normally, say, the signal from end of feed sensor 728 fails to appear between the SET and RESET conditions and 626 output goes + into 628 making 660 a 0 and 662 a +. The value of the voltage on one side of the capacitor 744 common to RESET input 666 (with respect to ground) is then determined by the RC time constant of resistor 742 and 744. Typically, gate 632 will be enabled by the voltage on the capacitor after 1 RC time constant. Approximately 30 seconds of delay is provided by 742 = 10 M ohms, 744 = 2.5μF.

After the delay time, in which the operator has presumably investigated the problem (indicated by lamp indication or lack of same), cleared it, and cycled the machine on SINGLE STROKE to reset all the automatic circuits FIGS. 6, 7 and 8 (in this case, the latched sensor signal sampling circuit), providing all + inputs to 626 making No. 82 a 0 into 628, the operator may press the manual reset button 712 which produces a + output from 632 into 630 making No. 86 a 0 into 628 and No. 84 a + latching 628 and 630 in the RUN condition and RUN output 660 a + and RESET output 662 a 0, discharging capacitor 744 through diode 746 and resistor 748. A typical 748 resistor value would be 20 K ohms. The operator may then switch to RUN and start the punch press as before.

For the NCD open circuit 708 and lamp 752 indication, the operator should press manual reset button 712 immediately after remedying the problem, and before single stroking so that, during the sampling (RESET) condition, No. 70 will be + into 626 which will enable the operator to reset RUN output 660 after the reset time delay.

The use of the circuit in FIG. 9 is not limited to punch presses as has been described in this example. With the many varied input and output terminals available for use, this circuit FIG. 9 has wide application in the electronic controls field.

MULTIPLE SENSOR MONITORING

Figure 10:
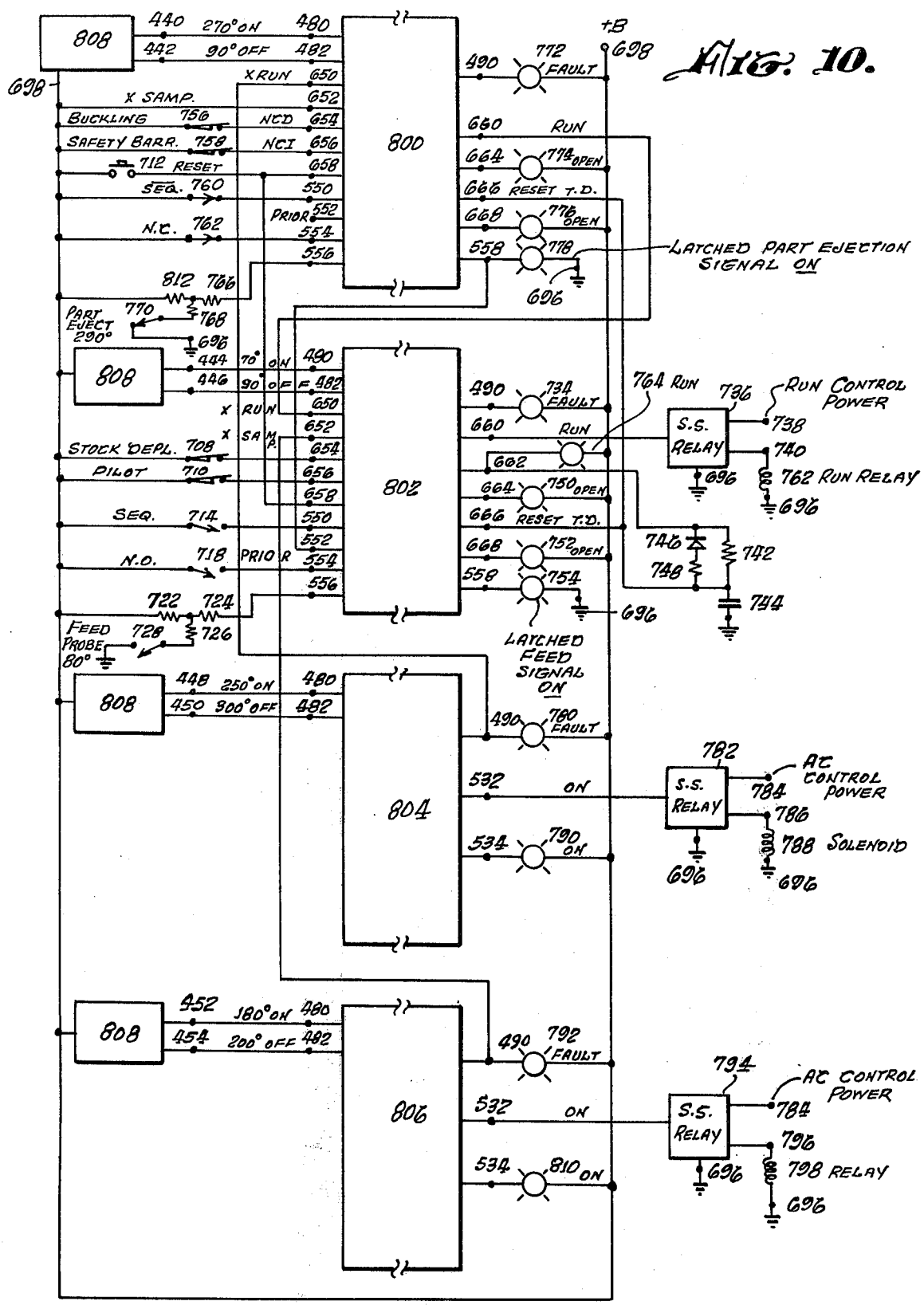
FIG. 10 is a diagram of a control circuit incorporating the circuit of FIG. 5 and a plurality of the circuits of FIG. 9.

FIG. 10 illustrates a control circuit for monitoring a plurality of sensors during a cycle of operation and providing output indications and controls.

The circuit of FIG. 10 utilizes four circuits 800, 802, 804 and 806, each having one each of FIGS. 6, 7 and 8 and generally corresponding to the single sensor monitor of FIG. 9, which are interconnected and have various input and output devices connected as shown, including a shaft encoder/decoder of FIG. 5. The encoder/decoder is shown in four boxes 808 for purposes of clarity. Other control pulse means are possible. In this arrangement, the circuits shown monitor parameters in a punch press operating including part ejection, feed progression, stock buckling, safety barrier, stock depletion, and die pilot switch. In addition, the circuit in FIG. 10 monitors control signals for faults and input signals for missing signals, continuously open, or continuously closed conditions.

Outputs controlled are punch press RUN relay, a solenoid operated air valve, the START relay in an auxilliary fabricating machine, and a number of indicator lamps including RUN, FAULT, OPEN and ON. ON and OFF pulses are supplied to 480 and 482 of circuits 800, 802, 804, and 806 from 440 and 442, 444 and 446, 448 and 450, and 452 and 454 of 808. 440 is + at 270°, 442 is + at 90°, 444 is + at 70°, 446 is + at 90°, 448 is + at 250°, 450 is + at 300°, 452 is + at 180°, and 454 is + at 200°. Feed probe 728 is contacted at 80°, and part ejection switch 770 opens at 290°.

In circuit 800, RUN input 650 receives the FAULT NOT +output 490 from 804. Upon a FAULT condition from 804, the RUN input 650 goes to 0, causing RUN output 660 to go to 0. The EXTRA sampling input 652 is held at + by 698. A N.C. BUCKLING switch 756 applies a + to 654. If the stock buckles between the feed rollers and the die-set, switch 756 will open making 654 a 0 which will immediately light OPEN lamp 776 connected between 668 and 698 and will drop RUN output 660 upon sampling at 90°. A N.C.

SAFETY BARRIER switch 758 supplies a + to 656. Upon switch 758 opening, RUN output 660 immediately goes to 0 and OPEN lamp 774 will light.

712 is the MANUAL RESET switch as described for FIG. 9. Toggle switch 760 selects NON-SEQUENTIAL, supplying a + to 550 thus removing the PRIOR signal requirement at 552. Toggle switch 762 selects a N.C. input sensor signal by supplying a + to 554. Resistors 768, 812 and 766 act as a current limiting array to provide 556 with + and 0 signals dependent upon switch 77C condition.

In this example, it is important to confirm that the fully formed part is severed from the strip and leaves the die before allowing the next strike. Part ejection in this case is sensed, where the parts being stamped out are of ferrous material, by an S.P.S.T., N.O. reed switch 770 connected between resistor 768 and ground 696 and physically placed beneath and in contact with a trough-like, non-magnetic, metal chute. A magnet, also beneath and in contact with the chute is placed so its field passes through and along the axis of the reed switch, thereby holding the contacts closed. The part, as it leaves the die, is constrained to slide down the inclined chute over the location of the magnet and reed switch. As the ferrous part enters the field of the magnet, more and more flux lines pass through the part due to its lower reluctance, being of greater mass than the reeds, and less and less flux lines pass through the reed switch until less flux lines than is necessary to hold the reed switch closed pass through it, and the reed switch opens generating a + signal at 556. As the part continues down the chute, over and past the magnet and reed switch, less and less flux lines pass through the part and more and more flux lines pass through the reed switch until the reed switch once again closes making 556 a 0 and ready to sense an ejected part on the next cycle of machine operation.

Lamp 772 connected between 490 and 698 will indicate a FAULT condition for improper control signals arriving at 480 and 482 as has been described. RUN output 660 is connected to EXTRA RUN output 650 in circuit 802. Lamp 778 connected between latched sensor signal output 558 and ground 696 will indicate reception of the part ejection signal. Reset input 666 is connected to 666 of 802.

In circuit 802, the EXTRA SAMPLING input 652 monitors FAULT NOT output 490 of 806. Stock depletion is monitored by N.C. switch 708 to sampling input 654. When stock is depleted, switch 708 opens making 654 a 0 and output 668 a 0 lighting OPEN lamp 752. Upon sampling initiated by OFF pulse from 446 at 90°, the RUN output 660 will go to 0. N.C. PILOT switch 710 supplies + to 656.

If the die closes and the strip is out of register with the die, a spring-loaded, moveable pin contacts the strip instead of entering a pilot hole and actuates switch 710, making 656 a 0 which causes RUN output 660 to go to 0 and also lights OPEN lamp 750. Manual reset is provided to 658 by switch 712. Toggle switch 714 selects SEQUENTIAL, a 0 to 550 which requires a PRIOR signal at 552 before a sensor signal will be accepted at 556. The prior signal for 802 is latched sensor output 558 from circuit 800. Switch 718 selects sensor input signal at 556 N.O., by making 554 a 0. Feed sensor probe 728 supplies + and 0 signals to 556 by means of resistor network 726, 722 and 724 as previously described for FIG. 9. In this case, feed probe 728 is N.O. making 556 a +, and the strip contacts the probe at the end of feed progression, 80°, making 556 a 0 at that point which provides a signal to be sampled, and causes 558 to be + which lights ON lamp 754 connected to ground 696. 490 provides FAULT monitoring of inputs from 444 and 446 of 808 and also lights FAULT lamp 734 when a fault occurs. RUN output 660 is applied to solid-state relay 736 which controls punch press RUN relay 762 as described for FIG. 9. RESET output 662 is 0 when RUN output 660 is + and lights RUN lamp 764 which is connected to 698. RESET output 662 also supplies the reset time delay circuit comprised of diode 746, resistors 742 and 748, and capacitor 744 as described for FIG. 9. Reset input 666 in 800 and 802 receives the delayed reset enable signal from capacitor 744.

In circuit 804, FAULT NOT output 490 monitors inputs from 448 and 450 of 808 and provides a 0 to light FAULT lamp 780 when a fault occurs. SET output 532 supplies a + to energize solid state relay 782 during SET condition of 804 while there is no FAULT for that circuit. In this example, 782 receives AC control power at 784 and energizes a solenoid 788, which operates an air valve, connected between output 786 and ground 696 when 532 is +. The air valve (not shown) controls a blast of air used to assist the removal of the fully formed part from the die. RESET output 534 is 0 when SET output 532 is + and during that period, lights ON lamp 790, indicating the energized condition of relay 782.

In circuit 806, FAULT NOT output 490 monitors inputs from 452 and 454 of 808 and provides a 0 to light lamp 792 when a fault occurs. SET output 532 supplies a + to solid state relay 784 during SET condition of 806 when there is no FAULT for that circuit. Relay 794 receives AC control power at 784 and energizes a relay 798 connected between output 796 and ground 696. Relay 798 is the START relay for a tapping machine which receives each formed part from the punch press and threads two holes in the part simultaneously, beginning its cycle of operation each time relay 798 is energized. RESET output 534 lights ON lamp 810 while relay 794 is energized. The other inputs and outputs of circuits 804 and 806 are not used in this example.

In operation, the circuit of FIG. 10 receives ON pulse 444 at 70°, setting 802. A + PRIOR signal is present at 552 input to 802. At 80°, feed probe 728 contacts the strip latching 558 and 586 of 802. At 90°, OFF pulse 446 samples STOCK DEPLETION switch 708, latched 586 (FIG. 7) and input 652 and resets 802 for the next cycle of operation. RUN output 660 continuously energizes relay 736 as long as all of the sampled signals are present during sampling and while all RUN inputs to 626 (FIG. 7) are continuously present throughout the complete machine cycle. At 180°, ON pulse at 452 makes 806 output 532 a + and 534 a 0, energizing relay 794 and lamp 810. At 200°, OFF pulse at 454 makes 806 output 532 a 0 and 534 a +, de-energizing relay 794 and lamp 810.

Any fault in input signals to 806 will make 490 a 0, lighting FAULT lamp 792, de-energizing relay 794 and will make sampling input 652 to 802 a 0. At 250°, ON pulse at 448 sets 804 which energizes relay 782 and lamp 790 as in 806. At 270°, ON pulse at 440 sets 800. At 290°, part ejection switch 770 opens when the part travels down the chute, providing latched output 558 and a signal to be sampled in 800 as in 802 before. 558 a + provides a + PRIOR signal to 552 of 802. At 300°, OFF pulse at 450 de-energizes relay 782 znd lamp 790. FAULT NOT output 490 of 804 is monitored by RUN input 650 of 800. At 90°, OFF pulse at 442 samples buckling switch 756, latched 586 (FIG. 7) and resets 800 for the next cycle of operation. Run output 660 is + to RUN input 650 in 802 as long as all of the sampled signals are present during sampling and while all RUN inputs to 626 (FIG. 7) are continuously present. At 90°, as described previously, OFF pulse at 446 samples and resets 802 as well.

As shown in FIG. 10, the input and output connections which can be utilized for various parameter monitoring are numerous and the combinations thereof are many. Additional FIG. 9 circuits may be added to the circuit of FIG. 10 to accommodate larger numbers of parameters which can be monitored and outputs which can be controlled.

I claim:

1. In a control system for a cyclicly operating machine, the combination of:
    means for generating position pulses corresponding to positions of the machine in its operating cycle;
    machine condition sensor means for generating sensor signals indicating machine condition;
    means having said position pulses and said sensor signals as inputs and providing output signals representative of machine conditions at preselected machine positions including means for providing a first output signal when position pulses are not generated in a predetermined sequence and means for providing a second output signal when sensor signals are not generated at predetermined machine positions; and
    means responsive to said output signals for stopping machine operation when a fault condition is sensed by a preselected sensor means at a predetermined machine position.

2. A control system as defined in claim 1 including means for stopping machine operation when said sensor signals are not generated in a preselected sequence.

3. A control system as defined in claim 2 including means for storing a sensor signal generated at one position in the machine operating cycle and sampling said stored signal at a later position.

4. A control system as defined in claim 3 including means for sampling at a second later preselected machine position, a stored sensor signal for a first earlier preselected machine position for use as a sensor signal at the time of said second preselected position.

5. A control system as defined in claim 1 including means for stopping machine operation when a position pulse is not received for a preselected machine position.

6. A control system as defined in claim 1 including means for stopping machine operation when a sensor signal is not received for a preselected machine position.

7. A control system as defined in claim 1 wherein said means for stopping includes means for immediately stopping machine operation when one preselected fault condition is sensed and means for stopping machine operation after a time delay when a different fault condition is sensed.

8. In a control system for cyclicly operating machine, the combination of:
    means for generating position pulses corresponding to positions of the machine in its operating cycle;
    machine condition sensor means for generating a sensor signal indicating a machine condition;
    means having said position pulses and said sensor signal as inputs and providing an output signal representative of machine condition at a preselected machine position, including means for providing a first output signal when position pulses are not generated in a predetermined sequence and means for providing a second output signal when said sensor signal is not generated at a predetermined machine position; and
    means responsive to said output signal for stopping machine operation when a fault condition is sensed at a preselected machine position.

9. A control system as defined in claim 8 including means for storing a sensor signal generated at one time and sampling said stored signal at a later time.

10. A control system as defined in claim 8 including:
    a second sensor means for generating a second sensor signal; and
    means responsive to said second sensor signal for stopping machine operation whenever said second signal is generated.

11. A control system as defined in claim 8 wherein said means for stopping includes means for immediately stopping machine operation when one preselected fault condition is sensed and means for stopping machine operation after a time delay when a different fault condition is sensed.

12. A control system as defined in claim 11 including means for resetting said control system to the initial condition permitting machine operation after machine operation has been stopped.

13. A control system as defined in claim 12 including time delay means blocking resetting of said control system for a predetermined time after machine operation has been stopped.

14. A control system as defined in claim 8 wherein said sensor means has switch open and closed conditions, and including means for selecting either of the open and closed conditions as the normal condition with the other condition being the fault condition.

15. A control system as defined in claim 1 including a matrix having a plurality of machine position inputs, a plurality of outputs, and means for connecting a combination of position inputs to first outputs and another combination of position inputs to second outputs.

16. A control system as defined in claim 15 wherein said plurality of outputs are connected to a plurality of sensor signal accepting, storage, and sampling means.

17. A control system as defined in claim 16 including a plurality of machine condition sensor means connected to said plurality of sensor signal accepting, storage and sampling means.

18. A control system as defined in claim 17 wherein said sampling means are connected to means for stopping machine operation.

19. A control system as defined in claim 17 including means for accepting a given machine condition sensor signal only if it is not present when a preselected first position pulse occurs, and is present before a second preselected pulse occurs.

20. A control system as defined in claim 19 including means for preselecting said sensor signal to be a low logical signal or a high logical signal.

21. A control system as defined in claim 20 wherein a first position pulse enables said storage means, the sensor signal sets said storage means, and the second position pulse resets and clears said storage means.

22. A control system as defined in claim 21 wherein the second position pulse samples said storage means.

23. A control system as defined in claim 15 including means for connecting each pair of first and second outputs to logic bistable means which provide latched set and reset signals.

24. A control system as defined in claim 23 including means for connecting said first and second outputs and the set and reset signals for each pair to logic means in which the first position and the second position pulses must alternate and which provides a fault condition signal upon an additional first position pulse occurring without an intervening second position pulse, and upon an additional second position pulse occurring without an intervening first position pulse, and upon the first position pulse condition and the second position pulse condition occurring simultaneously.

25. A control system as defined in claim 24 wherein said logic means includes means providing a constant output signal for alternating first and second position pulses and a different output signal for simultaneous or non-alternating first and second position pulses.

26. A control system as defined in claim 24 including means responsive to said fault condition signal for stopping machine operation.

27. A control system as defined in claim 26 including means for providing a visual indication of the fault condition when machine operation is stopped.

28. A control system as defined in claim 24 wherein said logic means includes four two-input NOR circuits and three two-input NAND circuits.

* * * * *

UNITED STATES PATENT AND TRADEMARK OFFICE
CERTIFICATE OF CORRECTION

PATENT NO. : 3,987,283
DATED : October 19, 1976
INVENTOR(S) : CHARLES R. MOELLER It is certified that error appears in the above-identified patent and that said Letters Patent are hereby corrected as shown below:

Column 5, line 14, change "cyclicly machine" to
 --cyclicly operating machine--
Column 8, line 17, change "angles such" to
 --angles (such--
Column 8, line 24, change "266,and 270" to
 --266, 268 and 270,--
Column 8, line 42, change "47" to --470--
Column 9, line 47, delete "CRM"
Column 10, line 6, change "453" to --458--
Column 11, line 4, delete "CRM"
Column 14, line 20, delete "CRM"
Column 14, line 48, delete "CRM"
Column 15, line 47, delete "CRM"
Column 17, line 59, delete "CRM" (two occurrences)

Signed and Sealed this

Seventeenth Day of May 1977

[SEAL]

Attest:

RUTH C. MASON
Attesting Officer

C. MARSHALL DANN
Commissioner of Patents and Trademarks